United States Patent
Hoffmann

(10) Patent No.: US 6,806,819 B2
(45) Date of Patent: Oct. 19, 2004

(54) INTEGRATED CIRCUIT FOR TARGETED BITLENGTH MANIPULATION FOR SERIAL DATA TRANSMISSION

(75) Inventor: Michael Hoffmann, Leopoldshöhe (DE)

(73) Assignee: Phoenix Contact GmbH & Co. KG, Blomberg (DE)

(*) Notice: Subject to any disclaimer, the term of this patent is extended or adjusted under 35 U.S.C. 154(b) by 0 days.

(21) Appl. No.: 10/372,540

(22) Filed: Feb. 24, 2003

(65) Prior Publication Data

US 2003/0172199 A1 Sep. 11, 2003

(30) Foreign Application Priority Data

Mar. 7, 2002 (DE) .................................. 102 10 003

(51) Int. Cl.[7] ................................................ H03N 9/00
(52) U.S. Cl. ................................... 341/100; 341/101
(58) Field of Search ................................. 341/100, 101

(56) References Cited

U.S. PATENT DOCUMENTS

| | | | |
|---|---|---|---|
| 4,799,040 A | * | 1/1989 | Yanagi ........................ 341/101 |
| 5,299,230 A | | 3/1994 | Jaeger et al. |
| 5,490,282 A | * | 2/1996 | Dreps et al. ..................... 710/1 |

FOREIGN PATENT DOCUMENTS

| | | |
|---|---|---|
| DE | 33 35 418 A1 | 4/1985 |
| DE | 198 55 707 A1 | 6/2000 |

OTHER PUBLICATIONS

Kong, D., 2.488 Gb/s SONET multiplexer/demultiplexer with frame detection capability, IEEE Journal on Selected Areas in Communications, vol. 9 No. 5, pp. 726–731.*
Gromann et al., HighSpeed Communications with RS–422/485, Electronics Industry, Sep. 2001, pp. 34–37.
Virtex–II Platform FPGA Handbook, Dec. 6, 2000, pp. 66–68, Xilinx.

* cited by examiner

*Primary Examiner*—Howard L. Williams
(74) *Attorney, Agent, or Firm*—Charles E. Baxley

(57) ABSTRACT

An integrated circuit for generating targeted bitlength manipulation of a transmitter for output of a serial datastream. A control unit (5) provides instructions regarding respective partial bits in a form of a partial bit vector (7) depending on bit statuses to be sent, and determines bitlengths for the serial datastream for output (9) to a wire or a signaling converter. The datastream (9) is generated using two partial bit register chains (14a–d, 15a–d), whose serial outputs (16, 17) are connected using a joining gate.

36 Claims, 4 Drawing Sheets

INTEGRATED CIRCUIT FOR TARGETED BITLENGTH MANIPULATION FOR SERIAL DATA TRANSMISSION

BACKGROUND OF THE INVENTION

1. Field of the Invention

The present invention relates to an integrated circuit for targeted bitlength manipulation of a transmitter for serial data transmission. More particularly, the present invention relates to an integrated circuit that is particularly suitable for integrated digital logic units.

2. Description of the Prior Art

As serial bus systems are further improved, increases in data transfer rate or maximum wire length may cause distortion of bit lengths in wires which have a progressively more serious effect on quality of a transmission. Particularly in serial data transmission through optical waveguides, as bit rate rose, transmission medium had to be improved correspondingly.

Equalization means on a receiver and complex integrated circuit for restoring a serial datastream are known from a number of sources including German Patent Nos. DE 33 35 418 A1 or DE 198 55 707 A1. A further possibility for improving transmission quality consists in pre-emphasizing a serial data signal in a transmitter. To ensure a most finely adjusted temporal differentiation possible in the pre-emphasis, high partial bit resolution is necessary. A disadvantage of this, however, is that in digital circuits, higher partial bit resolution requires a higher clock speed in order to generate a bit. All components of the integrated circuit used to generate a partial bit must possess a same rapid internal switching capability.

A receiving device for bit-serial asynchronous data transmission is taught by German Patent No. DE 33 35 418 A1. A measurement device which includes digital logic elements and is connected to a delay line is used to detect a received data signal in temporal relation to a local clock of a receiver. A gating device, known as a priority encoder, strips control signals accordingly, so that data bits are called in their correct phase in each case. For this purpose, phase position of the local clock must be brought into a desired temporal position relative to the received clock using a clock control unit. However, the clock control unit described here must be supported by high-performance signal runtimes to logic gates that are used in the clock control unit. These high demands in terms of signal runtimes cannot generally be satisfied in field programmable gate arrays (FPGAs).

German Patent No. DE 198 55 707 A1 teaches a device for generating a low-distortion receiving signal for high bit-rate transmissions. The receiving signal is analyzed in a receiver, wherein a pre-emphasis device in the receiver generates bits of an outgoing datastream based on a result of the analysis. Means for analyzing the receiving signal is extraordinarily complicated because weighting of each bit is done on a basis of a series of measurement points. Monitors receive the measurement points and control the pre-emphasis device based on results of the measurement. The means for providing the low-distortion receiving signal also requires extremely sophisticated and rapid components which analyze the receiving signal and address the pre-emphasis device based on results of the analysis. Such a device for providing a low-distortion receiving signal can only be integrated in field programmable gate arrays (FPGAs), if at all, with application of an extremely complex circuit design. A further disadvantage that applies to all pre-emphasis devices in receivers is that after a certain degree of distortion, the receiving signal is no longer recognizable and plausible pre-emphasis is therefore no longer possible.

In "High Speed Communication with RS-422/485", Elektronik Industrie [Electronics Industry], 9 2001, pre-emphasis of a data signal in a transmitter is described. In the temporal pre-emphasis, a system clock must be an integral multiple of a bit clock (data rate). It follows that a smallest partial bit length is directly dependent on the system clock, which means that when very short partial bits are essential to allow precise adjustment of bit lengths to a transmission path, a fast system clock is needed.

A settable clock generation within an FPGA is described in "Virtex-II Platform FPGA Handbook", Xilinx, Dec. 6, 2000. The clock generation is capable of providing multiple timing signals at one clock rate in different phase positions. With the settable clock generation, it is possible to measure up to 4 timing signals having a same clock rate but in different phase positions. However, a set phase position of a respective timing signal can only be initialized before the device is put into operation, i. e. it must be preset and cannot be altered during operation. A phase position that is controllable during operation can only be changed by stages, which means that it is not possible to manipulate a bit over a longer temporal range.

SUMMARY OF THE INVENTION

The object of the present invention is to provide a simple and inexpensive circuit design for targeted bitlength manipulation for serial transmission of data. The integrated circuit generates the datastream to be transmitted in which bits for output are subjected to a targeted bitlength manipulation process. The integrated circuit is realized by means of highly integrated field programmable gate arrays (FPGAs) with digital logic units, wherein requirements of an internal system clock are not very stringent, and with a result that the integrated circuit may be provided with internal runtimes of the FPGAs.

The serial datastream to be transmitted is entered serially into a history register with a bit clock associated with a data rate and having a scanning clock of the data rate. A gating device analyzes the datastream to be outputted with reference to bit statuses in the history register. The gating device in turn indicates which individual partial bits are to be transmitted to a wire or a signaling converter—not further described here—as a serial data stream with a system clock at a speed that is a multiple of a prior clock. Rules regarding a number of partial bits by which each bit is to be manipulated are stored as values in the gating device, or are provided by another device, which is not further described here. Multiple partial bit register chains are provided, wherein each register chain is clocked relative to a next partial bit register chain with a phase shifted system clock.

In a simplest case, the integrated circuit according to the present invention has two partial bit register chains, wherein a first is clocked using the system clock, and a second is clocked with an inverse of the system clock thereby achieving a phase shift of 180 degrees. Both partial bit register chains are loaded with a parallel data vector determined by the gating unit before each bit is outputted. Using an offset arrangement of partial bits in the partial bit register chains, the partial bits are always outputted according to half periodic duration of the system clock. In this case, offset arrangement is understood to mean that, for example, in the first partial bit register chain, starting with bit 0, every second partial bit thereafter in the first partial bit register chain is preloaded in parallel, and in the second partial bit register chain, starting with bit 1, every second partial bit thereafter in the second partial bit register chain is preloaded in parallel. A gate as a joining link of the serial output from the first partial bit register chain with the serial output from the second partial bit register chain generates the pre-emphasized serial datastream to be outputted. The gate is an only internal circuit component which must have a rapid response capability and minimal runtime differentials for an output of a 0 status as compared with an output of a 1 status.

LIST OF REFERENCE NUMERALS UTILIZED IN THE DRAWING

1: History register
2: Serial datastream Ser_Data
3: CLK_B, scanning clock for serial datastream
4: History bit vector
5: Control unit
6: CLK_TB, system clock
7: Partial bit vector TB0 to TB7
8: Bit generator
9: Generated datastream Ser_Data_Out
10: Load control signal for accepting partial bit vector
11: Multiplexer
12a–h: Register
13: Multiplexer
14a–d: Register of the first register chain
15a–d: Register of the second register chain
16: Serial output of the first register chain
17: Serial output of the second register chain
18: Gate
19: CLK_TB_180, 180 degree phase-inverted system clock
20: Bit length
21: First 1 shortening
22: Second 1 shortening
23: Start time

DETAILED DESCRIPTION OF THE INVENTION

Figure 1:
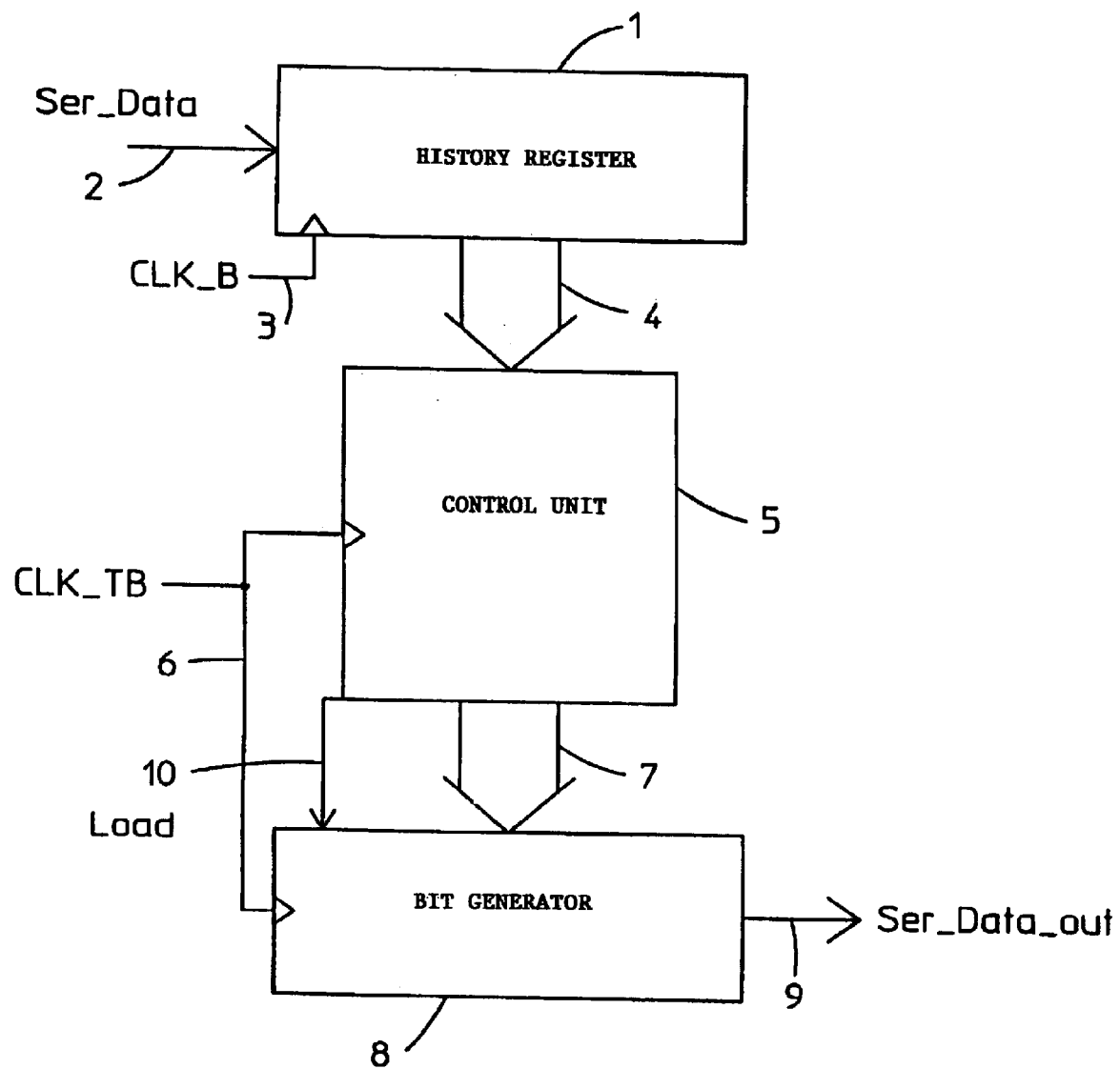
FIG. 1: shows an overview of functional components for bitlength manipulation of a serial datastream.

FIG. 1 shows functional components for bit length manipulation in a transmitter for serial data transmission. A serial data stream 2 for transmission is read into a history register 1, one bit at a time, together with its scanning clock CLK_B 3. Clock frequency of the scanning clock CLK_B 3 matches a data rate of the serial data stream 2. For every bit that is read into the history register 1, a control unit 5 receives a history bit vector 4 which contains bit status of a bit that is currently due for transmission and status of previous and following bits. Based on respective statuses of the previous and the following bits, a gating unit determines bit length of a bit that is currently due to be transmitted and transfers this information to a bit generator 8 with the aid of a partial bit vector 7. A control signal Load 10 activates acceptance of the partial bit vector 7 in the bit generator 8 at a same temporal interval as the data rate. In order to generate individual bits for the datastream to be an output Ser_Data Out 9, the bit generator 8 requires a faster system clock CLK_TB 6 at which a clock period corresponds to a partial bit length. For example, the faster system clock CLK_TB 6 may have a clock frequency four times faster than the scanning clock CLK_B 3.

Figure 2:
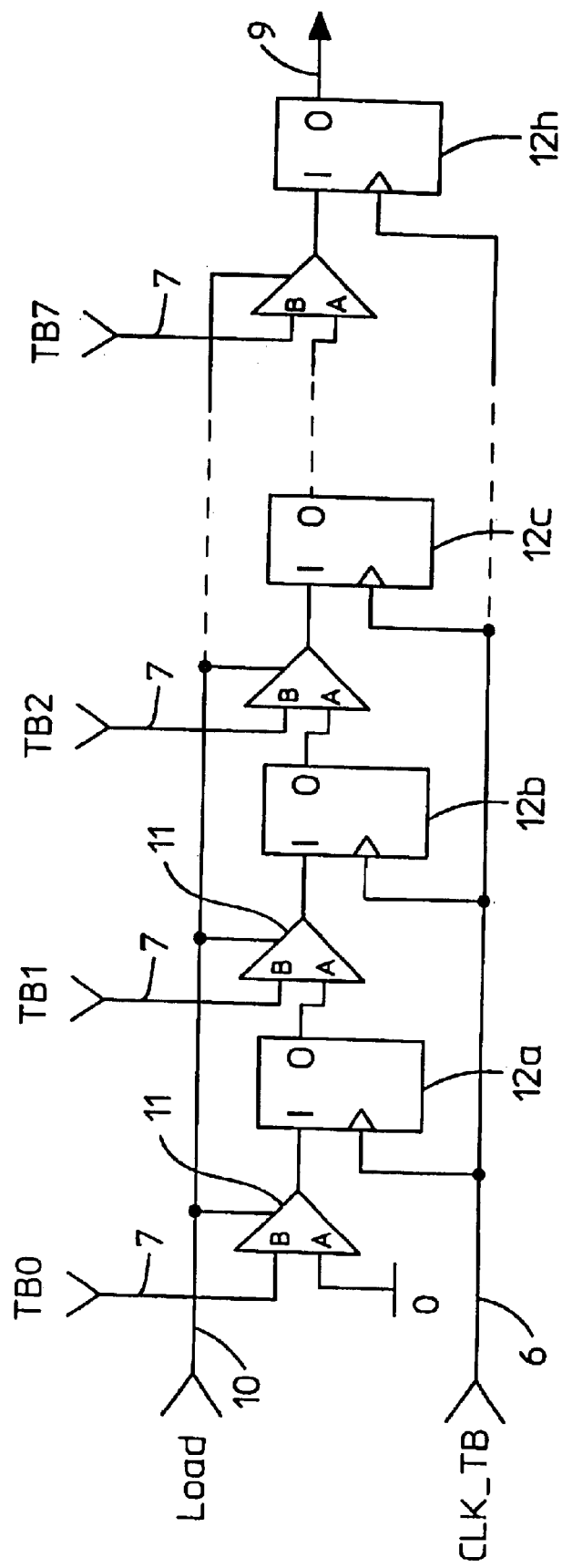
FIG. 2: shows a circuit arrangement for generating manipulated bits in a conventional manner (prior art)

FIG. 2 shows a circuit arrangement for generating bits of the datastream 9 to be outputted in which, for example, each bit to be outputted is generated from eight partial bits. The active Load control signal 10 switches eight multiplexers 11 to a switching status B so that each associated partial bit is incident at an input for each register 12a–h for loading this register. After the further system clock CLK_TB 6, all eight multiplexers 11 are switched to a position A, so an output from a first register 12a is connected to an input to a second register 12b, an output from a second register 12b is connected to an input to a third register 12c, and so on. The system clock CLK_TB 6 thus serves to ensure that all eight registers 12a–h are constantly synchronized throughout the process, with a result that contents of individual registers are outputted in series as the datastream 9 for outputting. A respective status of an eighth register 12h provides the total serial datastream 9 for outputting. At a same time, however, the integrated circuit in this example must be capable of processing signals for the serial datastream eight times as fast as a rate of the scanning clock CLK_B 3. It is very difficult to integrate this circuit arrangement in field pro-grammable gate arrays (FPGAs) because processing speed of the FPGAs is too slow at high data rates. For example, if clock frequency of the system clock is 16 MHz, a data transfer rate of 2 MBit/s must be assured.

Figure 3:
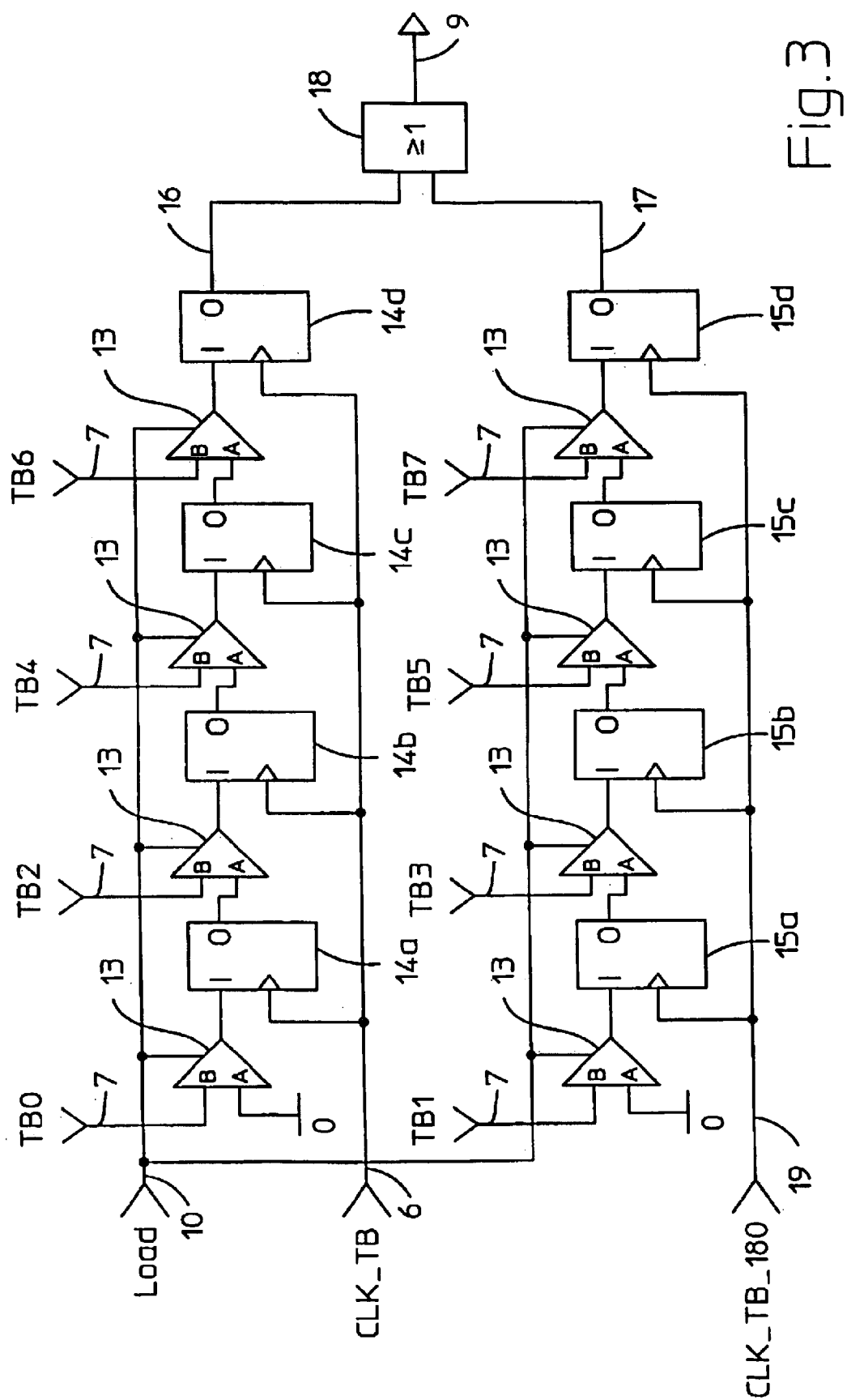
FIG. 3: shows an example of the integrated circuit according to the present invention for generating manipulated bits.

In order to be able to increase the data rate of the serial datastream for a same number of partial bits, the register chains must be divided into two or more register chains as shown in FIG. 3, wherein the registers of each register chain is clocked with a system clock in different phase positions.

The following description refers to two register chains, but the integrated circuit may be arranged to work with multiple register chains. A first register chain consists of registers 14a–d and is clocked with the system clock CLK_TB 6. A second register chain consists of registers 15a–d and is clocked with a system clock CLK_TB_180 19 which is phase shifted through 180 degrees. A first register 14a of the first register chain is loaded with a partial bit TB0, a second register 14b with a partial bit TB2, a third register 14c with a partial bit TB4, and a fourth register 14d with a partial bit TB6. A first register 15a of the second register chain is loaded with a partial bit TB1, a second register 15b with a partial bit TB3, a third register 15c with a partial bit TB5, and a fourth register 15d with a partial bit TB7. Parallel loading of all registers is achieved by switching multiplexers 13 to a switching position B. The multiplexers 13 are addressed via the Load control signal 10. The manipulated datastream 9 is generated using a gate 18 as a joining or a connection of a serial output 16 of the first register chain with a serial output 17 of the second register chain. In this way, the registers of the first and second register chains only have to process all signals four times as fast as the data rate of the serial datastream. For a system clock of 16 MHz, therefore, a data rate of 4 Mbit/s must be generated when 8 partial bits make up one databit.

Figure 4:
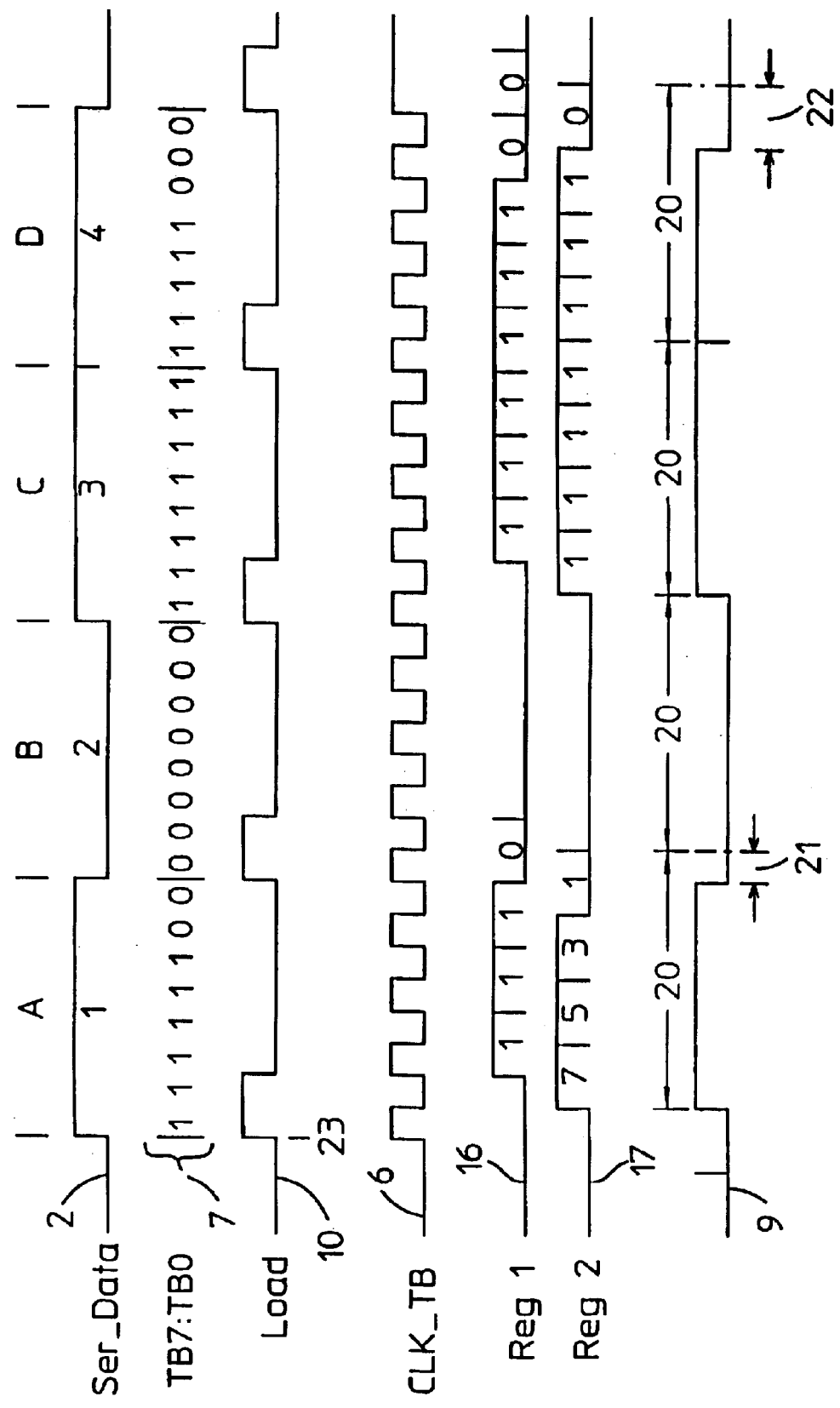
FIG. 4: shows timing behavior of signals in the integrated circuit according to the present invention in a timing diagram.

FIG. 4 is a timing diagram that represents functioning of the output of the manipulated datastream 9 as determined by the partial bit vectors 7 TB0 . . . TB7. For purposes of simplicity, only the clock for the registers of the first partial bit register chain is shown, according to which the registers of the first partial bit register chain are clocked with a positive timing edge and the registers of the second partial bit register chain are clocked with a negative timing edge. At a starting time 23, the partial bit vector is loaded into the registers 14a–14d and 15a–15d. The 1 status of the Load control signal 10 switches the multiplexers 13 to the position B which causes a respective partial bit 7 to be incident at an input of an associated register 14a–d, 15a–d. With the first negative timing edge of the timing signal 6 CLK_TB, status of the partial bit TB7 is output to the serial output 17 of the second register chain. With the first positive timing edge of the timing signal 6 CLK_TB, status of the partial bit TB6 is output to the serial output 16 of the first register chain. Thereafter, the Load control signal 10 for partial bit addition is deactivated for a remainder of the bit length period, so that sequential switching of the registers of the first and second register chains each form an offset register. With the second negative timing edge of the timing signal 6 CLK_TB, status of the partial bit TB5 is output to the serial output 17 of the second register chain. With the second positive timing edge of the timing signal 6 CLK_TB, status of the partial bit TB4 is output to the serial output 16 of the first register chain. The output 9 from the gate 18 is created through a combining or a connection of the serial output 16 of the first register chain with the serial output 17 of the second register chain.

In an exemplary circuit arrangement, status 1 at either of the two serial outputs 16, 17 always provides status 1 to the output 9 of the gate 18. However, a combining connection can also be constructed by other means. With a third negative timing edge of the timing signal 6 CLK_TB, the 1 status of the partial bit TB3 is output to the serial output 17 of the second register chain. With the third positive timing edge of the timing signal 6 CLK_TB, the 1 status of the partial bit TB4 is output to the serial output 16 of the first register chain. With a fourth negative timing edge of the timing signal 6 CLK_TB, the 0 status of the partial bit TB1 is output to the serial output 17 of the second register chain. With the fourth positive timing edge of the timing signal 6 CLK_TB, the 0 status of the partial bit TB4 is output to the serial output 16 of the first register chain, which results in a shortening 21 of the 1 status to be outputted after this time. With the fourth positive timing edge of the timing signal 6 CLK_TB, status of the Load control signal 10 is also switched to 1 which causes the multiplexers 13 to be returned to position B, so that they can load the partial bit vector for the second bit to be outputted. After this, each partial bit is incident on the input of an associated register 14a–d, 15a–d. Then, the serial partial bit output is repeated as described above. A second 1 shortening 22 is also achieved by attachment of the associated partial bit vector 7. In this case, the first two registers 14a and 14b of the first register chain receive a status 0 via the associated partial bits TB0 and TB2. The first register 15a of the second register chain also receives a status 0 via the associated partial bit TB1. Serial output of the partial bit statuses is carried out in a manner described above. Each individual bit to be outputted is generated from the instructed partial bits 7. The integrated circuit according to the present invention also allows manipulations in a form of other temporal status sequences of the partial bits for any bit status.

What is claimed is:

1. An improved integrated circuit for generating targeted bitlength manipulation of a transmitter for output of a serial datastream, wherein a control unit (5) provides instructions regarding respective partial bits in a form of a partial bit vector (7) depending on bit statuses, so that bitlengths are determined for the serial datastream for output (9) to one of a wire and a signaling converter, said improvement comprising each bit to be outputted consisting of at least two partial bit register chains (14a–d, 15a–d) which are provided to generate the bits for outputting, wherein the improvement comprises:

an individual system clock (16, 19) being provided for each partial bit register chain; and when two partial bit register chains are used, a first partial bit resister chain is locked with a non phase-shifted system clock (6) and a second partial bit register chain is clocked with a system clock (19) that is phase-shifted through 180 degrees.

2. The improved integrated circuit according to claim 1, wherein the improvement comprises the partial bit register chains being loaded in parallel with the instructed value of the partial bit vector (7).

3. The improved integrated circuit according to claim 2, wherein the improvement comprises the registers (14a–d, 15a–d) of the partial bit register chains being loaded in parallel with the instructed value of the partial bit vector (7) at a start of a respective bit for outputting.

4. The improved integrated circuit according to claim 2, wherein the improvement comprises a multiplexer (13) being used to switch an input of a register (14a–d, 15a–d) of the partial bit register chain during loading in parallel on each provided partial bit.

5. The improved integrated circuit according to claim 2, wherein the improvement comprises outputs (16, 17) of a last register in each case (14d, 15d) of all partial bit register chains being joined using a joining gate (18).

6. The improved integrated circuit according to claim 2, wherein the improvement comprises a multiplexer (13) being used to switch an input of a register (14b–d, 15b–d) with an output of a preceding register (14a–c, 15a–c) of the partial bit register chain to yield a serial output of the partial bits.

7. The improved integrated circuit according to claim 2, wherein the improvement comprises the integrated circuit being created using logic elements in a programmable digital portion of an FPGA.

8. The improved integrated circuit according to claim 2, wherein the improvement comprises the integrated circuit being created using logic elements in a customer-specific ASIC circuit.

9. The improved integrated circuit according to claim 2, wherein the improvement comprises the integrated circuit being created from individual standard logic elements.

10. The improved integrated circuit according to claim 1, wherein the improvement comprises the registers (14a–d, 15a–d) of the partial bit register chains being loaded in parallel with the instructed value of the partial bit vector (7) at a start of a respective bit for outputting.

11. The improved integrated circuit according to claim 10, wherein the improvement comprises a multiplexer (13) being used to switch an input of a register (14a–d, 15a–d) of the partial bit register chain during loading in parallel on each provided partial bit.

12. The improved integrated circuit according to claim 10, wherein the improvement comprises outputs (16, 17) of a last register in each case (14d, 15d) of all partial bit register chains being joined using a joining gate (18).

13. The improved integrated circuit according to claim 10, wherein the improvement comprises a multiplexer (13) being used to switch an input of a register (14b–d, 15b–d)

with an output of a preceding register (14a–c, 15a–c) of the partial bit register chain to yield a serial output of the partial bits.

14. The improved integrated circuit according to claim 10, wherein the improvement comprises the integrated circuit being created using logic elements in a programmable digital portion of an FPGA.

15. The improved integrated circuit according to claim 10, wherein the improvement comprises the integrated circuit being created using logic elements in a customer-specific ASIC circuit.

16. The improved integrated circuit according to claim 10, wherein the improvement comprises the integrated circuit being created from individual standard logic elements.

17. The improved integrated circuit according to claim 1, wherein the improvement comprises a multiplexer (13) being used to switch an input of a register (14a–d, 15a–d) of the partial bit register chain during loading in parallel on each provided partial bit.

18. The improved integrated circuit according to claim 17, wherein the improvement comprises outputs (16, 17) of a last register in each case (14d, 15d) of all partial bit register chains being joined using a joining gate (18).

19. The improved integrated circuit according to claim 17, wherein the improvement comprises a multiplexer (13) being used to switch an input of a register (14b–d, 15b–d) with an output of a preceding register (14a–c, 15a–c) of the partial bit register chain to yield a serial output of the partial bits.

20. The improved integrated circuit according to claim 17, wherein the improvement comprises the integrated circuit being created using logic elements in a programmable digital portion of an FPGA.

21. The improved integrated circuit according to claim 17, wherein the improvement comprises the integrated circuit being created using logic elements in a customer-specific ASIC circuit.

22. The improved integrated circuit according to claim 17, wherein the improvement comprises the integrated circuit being created from individual standard logic elements.

23. The improved integrated circuit according to claim 1, wherein the improvement comprises outputs (16, 17) of a last register in each case (14d, 15d) of all partial bit register chains being joined using a joining gate (18).

24. The improved integrated circuit according to claim 23, wherein the improvement comprises a multiplexer (13) being used to switch an input of a register (14b–d, 15b–d) with an output of a preceding register (14a–c, 15a–c) of the partial bit register chain to yield a serial output of the partial bits.

25. The improved integrated circuit according to claim 23, wherein the improvement comprises the integrated circuit being created using logic elements in a programmable digital portion of an FPGA.

26. The improved integrated circuit according to claim 23, wherein the improvement comprises the integrated circuit being created using logic elements in a customer-specific ASIC circuit.

27. The improved integrated circuit according to claim 23, wherein the improvement comprises the integrated circuit being created from individual standard logic elements.

28. The improved integrated circuit according to claim 1, wherein the improvement comprises a multiplexer (13) being used to switch an input of a register (14b–d, 15b–d) with an output of a preceding register (14a–c, 15a–c) of the partial bit register chain to yield a serial output of the partial bits.

29. The improved integrated circuit according to claim 28, wherein the improvement comprises the integrated circuit being created using logic elements in a programmable digital portion of an FPGA.

30. The improved integrated circuit according to claim 28, wherein the improvement comprises the integrated circuit being created using logic elements in a customer-specific ASIC circuit.

31. The improved integrated circuit according to claim 28, wherein the improvement comprises the integrated circuit being created from individual standard logic elements.

32. The improved integrated circuit according to claim 1, wherein the improvement comprises the integrated circuit being created using logic elements in a programmable digital portion of an FPGA.

33. The improved integrated circuit according to claim 1, wherein the improvement comprises the integrated circuit being created using logic elements in a customer-specific ASIC circuit.

34. The improved integrated circuit according to claim 1, wherein the improvement comprises the integrated circuit being created from individual standard logic elements.

35. An improved integrated circuit for generating targeted bitlength manipulation of a transmitter for output of a serial datastream, wherein a control unit (5) provides instructions regarding respective partial bits in a form of a partial bit vector (7) depending on bit statuses, so that bitlengths are determined for the serial datastream for output (9) to one of a wire and a signaling converter, said improvement comprising each bit to be outputted consisting of at least two partial bit register chains (14a–d, 15a–d) which are provided to generate the bits for outputting;

wherein the improvement comprises when four partial bit register chains are used, a first partial bit register chain is clocked with a non phase-shifted system clock and a second partial bit register chain is clocked with a system clock that is phase-shifted through 90 degrees, and a third partial bit register chain is clocked with a system clock that is phase-shifted through 180 degrees, and a fourth partial bit register chain is clocked with a system clock that is phase-shifted through 270 degrees.

36. An improved integrated circuit for generating targeted bitlength manipulation of a transmitter for output of a serial datastream, wherein a control unit (5) provides instructions regarding respective partial bits in a form of a partial bit vector (7) depending on bit statuses, so that bitlengths are determined for the serial datastream for output (9) to one of a wire and a signaling converter, said improvement comprising: each bit to be outputted consisting of at least two partial bit register chains (14a–d, 15a–d) which are provided to generate the bits for outputting; and when n partial bit register chains are used, each successive bit register chain is clocked with a corresponding non-phase-shift system clock that is phase-shifted through 360°/n.

* * * * *